No. 702,990. Patented June 24, 1902.
F. C. O'BRIEN.
ORE SEPARATOR.
(Application filed Feb. 7, 1900.)
(No Model.) 5 Sheets—Sheet 1.
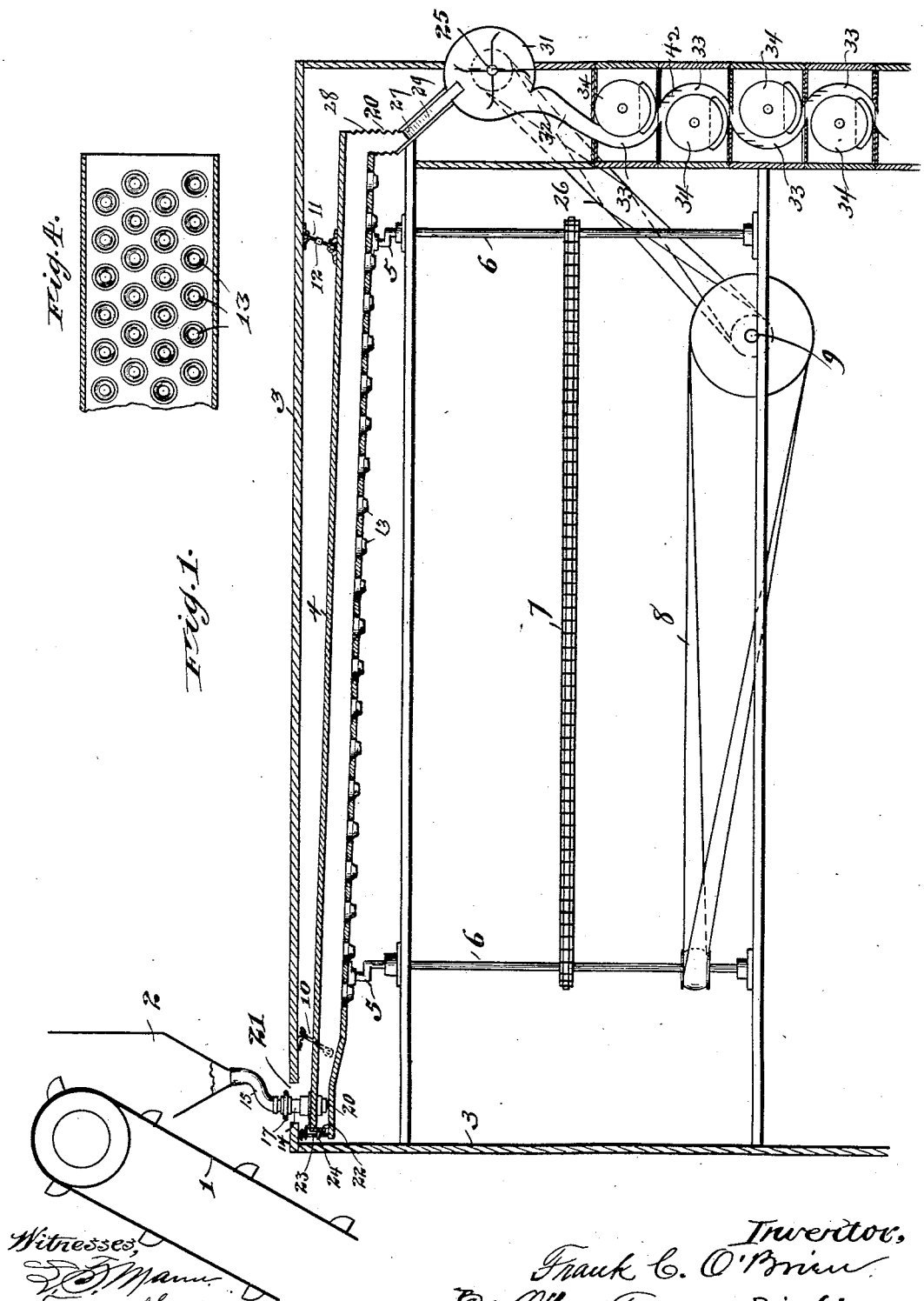

No. 702,990. Patented June 24, 1902.
F. C. O'BRIEN.
ORE SEPARATOR.
(Application filed Feb. 7, 1900.)
(No Model.) 5 Sheets—Sheet 2.
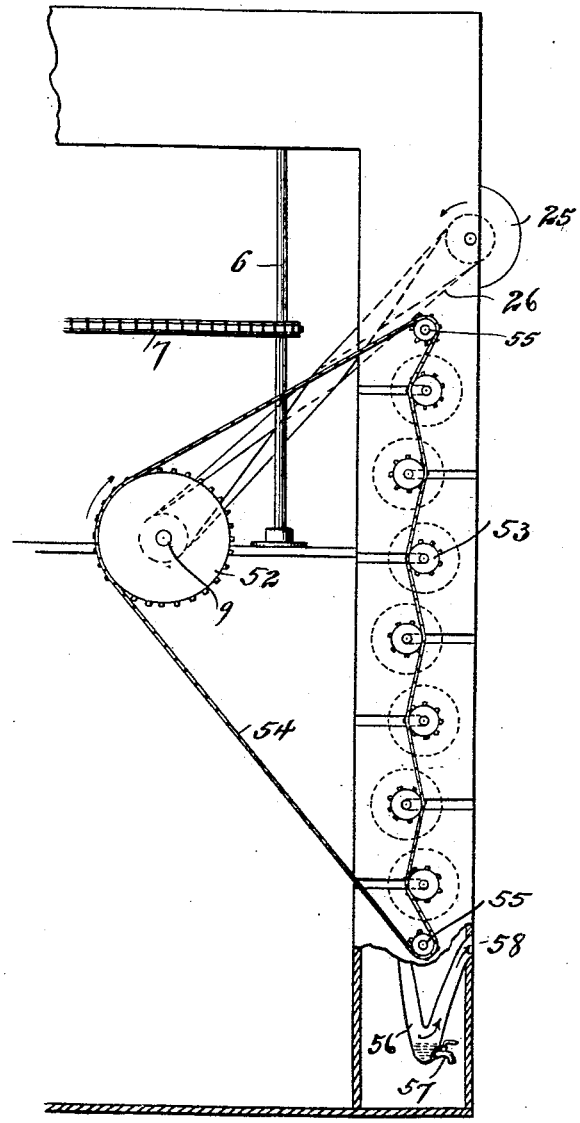
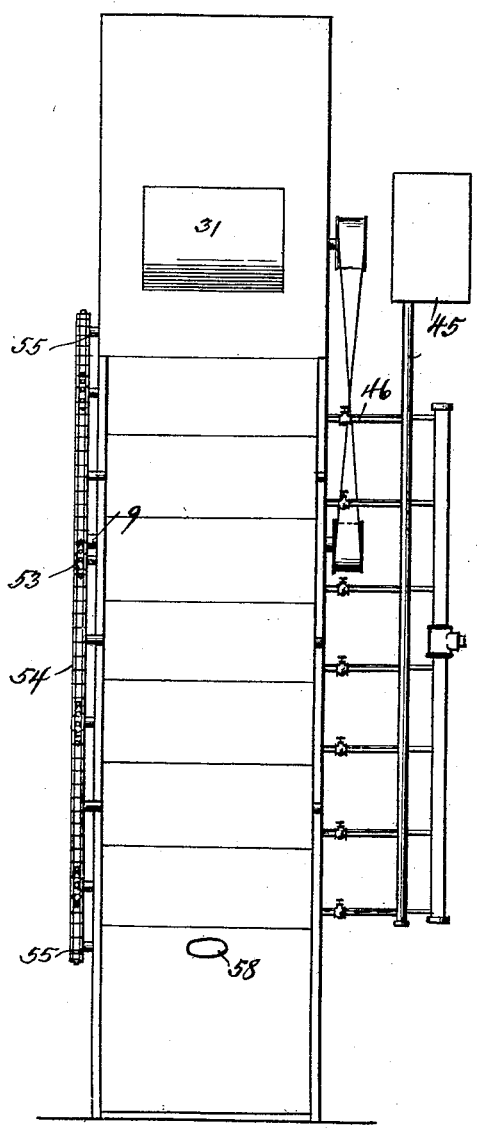

No. 702,990. Patented June 24, 1902.
F. C. O'BRIEN.
ORE SEPARATOR.
(Application filed Feb. 7, 1900.)
(No Model.) 5 Sheets—Sheet 3.
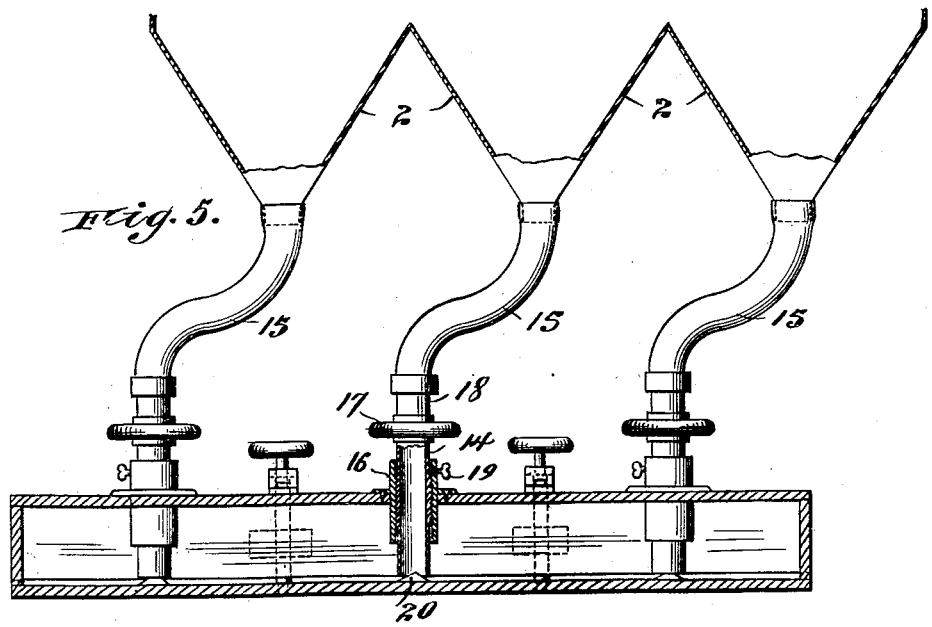
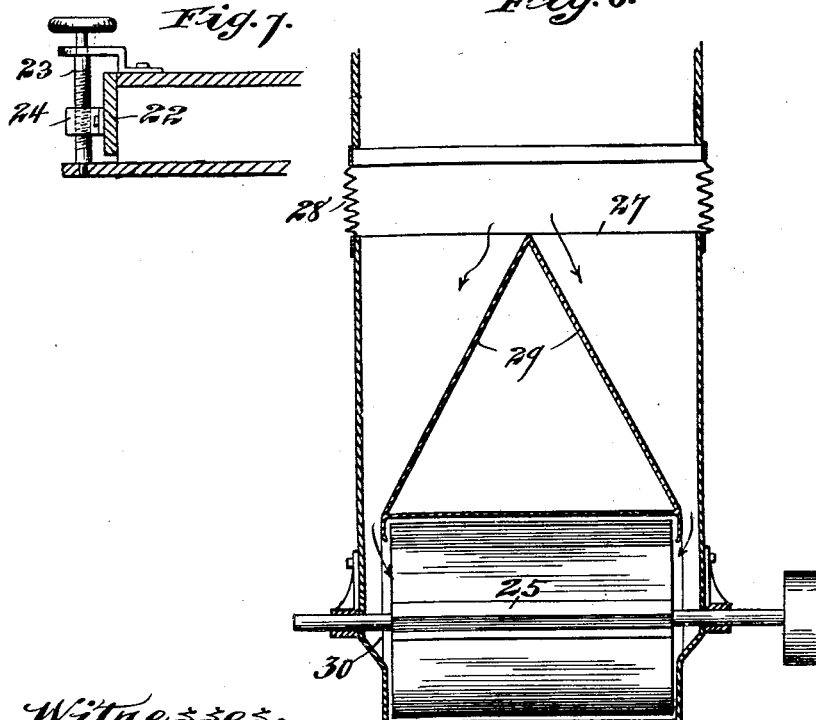
Witnesses,
Inventor,
Frank C. O'Brien

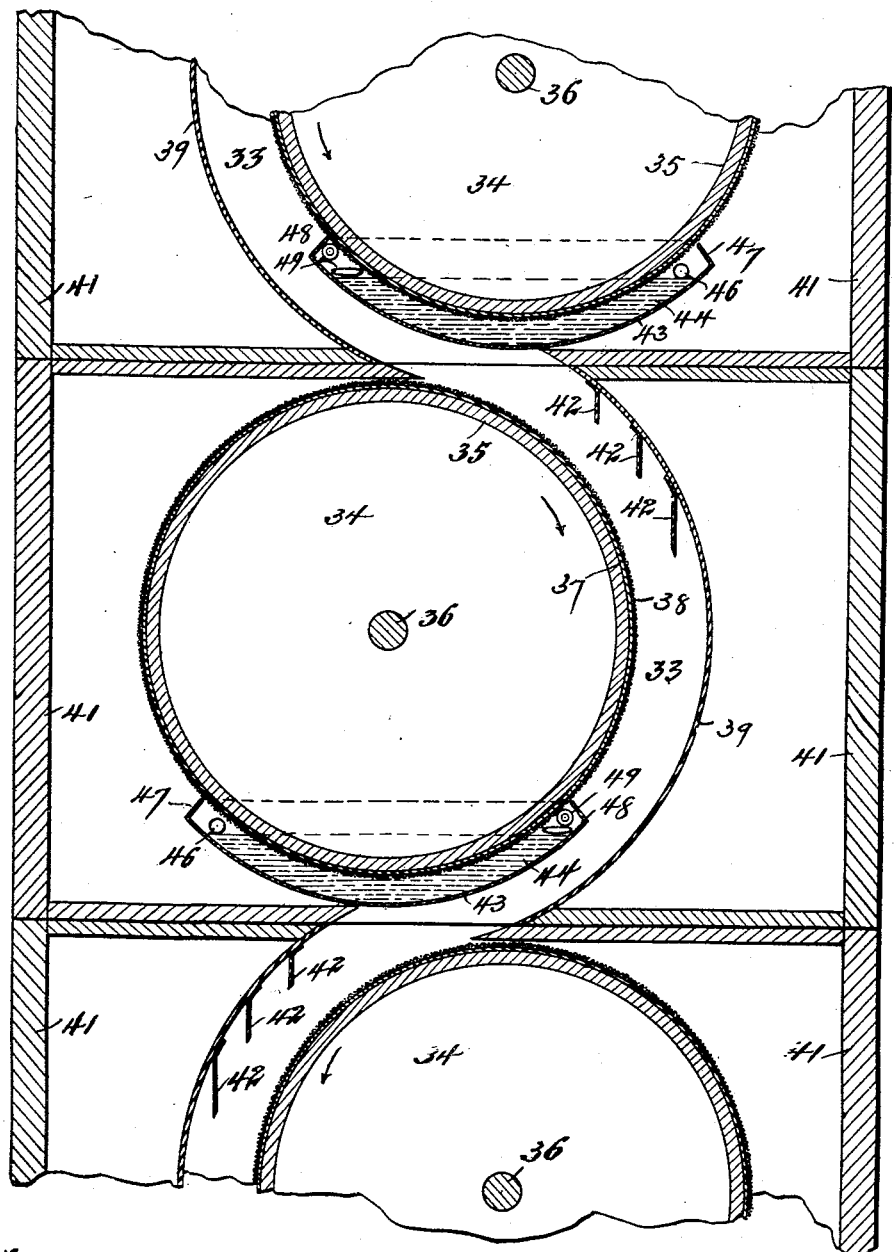

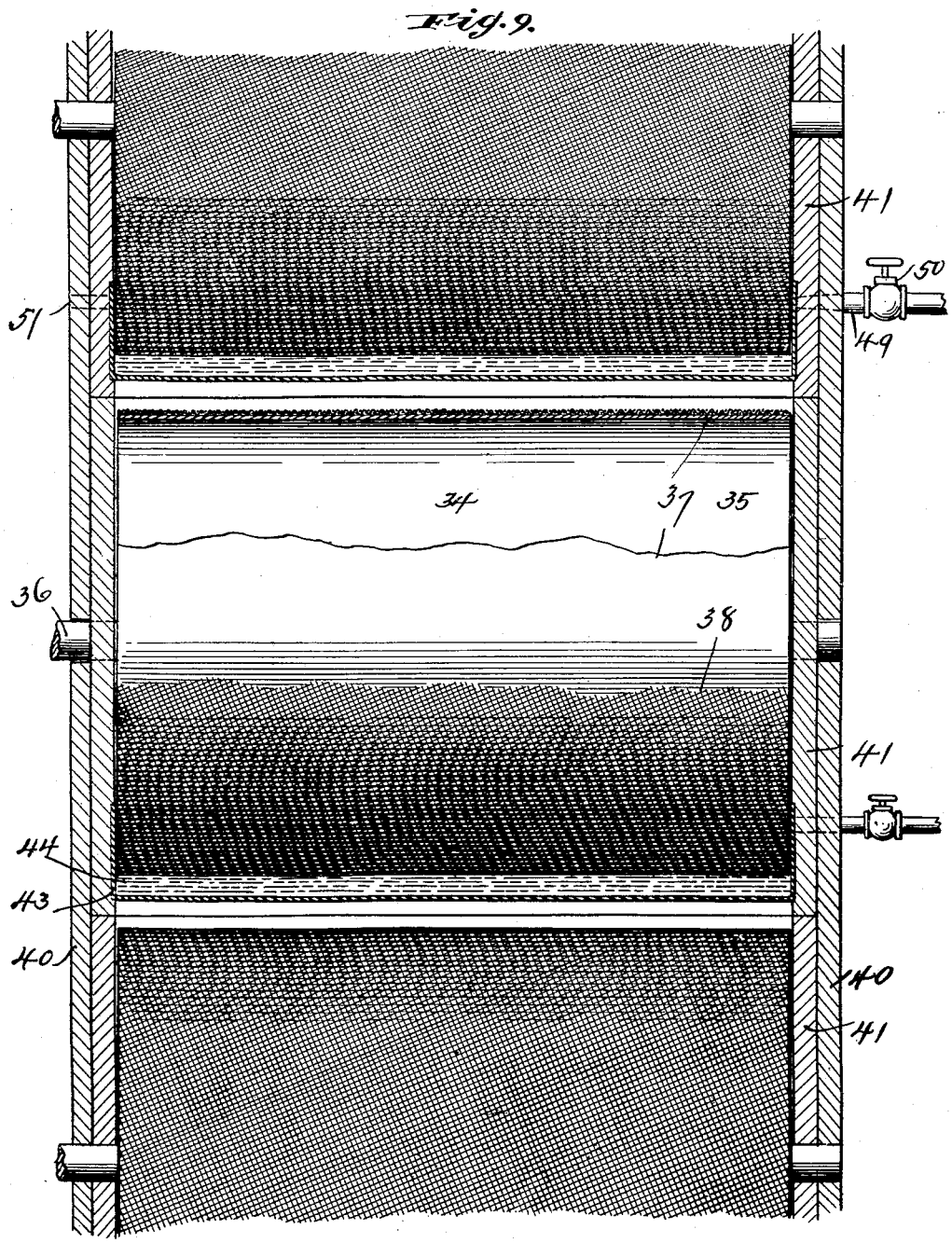

UNITED STATES PATENT OFFICE.

FRANK C. O'BRIEN, OF CHICAGO, ILLINOIS.

ORE-SEPARATOR.

SPECIFICATION forming part of Letters Patent No. 702,990, dated June 24, 1902.

Application filed February 7, 1900. Serial No. 4,306. (No model.)

*To all whom it may concern:*

Be it known that I, FRANK C. O'BRIEN, a citizen of the United States, residing at Chicago, in the county of Cook and State of Illinois, have invented certain new and useful Improvements in Ore-Separators, of which the following is a specification.

This invention relates to ore-separators, and more particularly to that class known as "dry" separators, in which the use of water is dispensed with.

The present invention has for its object to provide means for the more efficient separation of the ore, and more particularly the provision of means whereby the more minute particles of ore, which ordinarily escape in the form of an extremely fine dust, may be collected and saved.

To these ends my invention consists in certain novel features, which I will now proceed to describe and will then particularly point out in the claims.

In the accompanying drawings, Figure 1 is a view, partly in elevation and partly in section, of a separator embodying my invention in one form, the lower portion thereof being omitted. Fig. 2 is a side elevation of a portion of the same. Fig. 3 is an end elevation. Fig. 4 is a plan section of a portion of the agitator or concentrator. Fig. 5 is a vertical sectional view taken on the line 5 5 of Fig. 1, one of the feed-regulating devices being shown in vertical section. Fig. 6 is a view, partly in section and partly in plan, of the discharge end of the agitator and the adjacent mechanism. Fig. 7 is an enlarged sectional view through the air-inlet end of the agitator. Fig. 8 is a vertical sectional view, on an enlarged scale, through the amalgamating drums or cylinders and their coöperating air-conduit. Fig. 9 is a view, partly in elevation and partly in section, of the structure shown in Fig. 8; and Fig. 10 is a view similar to Fig. 8, but on a smaller scale, illustrating a modified form of the apparatus.

In carrying out my invention I prefer to employ one or more elevators, (indicated at 1,) by means of which the ore, which has previously been reduced to a powder of the desired degree of fineness, is delivered to the feeding hopper or hoppers, which are indicated at 2. In the present instance three of these hoppers are shown; but their number may obviously be varied, as desired. A suitable supporting frame or casing 3 incloses the agitator or concentrator 4, to which motion is imparted by cranks 5 on upright shafts 6, connected to move in unison by sprocket-gearing 7 and driven by a belt 8 from the main shaft 9 of the apparatus. The agitator 4 is suspended at its receiving end by links 10 from the frame or casing 3 and is inclined downward from its receiving to its discharge end. The discharge end is supported by a link 11, made in two parts and connected by a turn-buckle or sleeve 12, so that the length of the said link may be adjusted to vary the inclination of the agitator. The ends of the link 11 are connected by ball-and-socket or other universal joints to the agitator and to the frame 3, respectively. The agitator 4 is in the shape of a closed box, open at its receiving and discharge ends only, and its inclined bottom is provided with a plurality of cups or depressions 13 for the purpose hereinafter set forth. The pulverized ore is fed into the receiving end of the agitator through feed-pipes 14, which extend downward through the top of the agitator almost to the bottom thereof and which are connected by flexible pipes 15 with the respective hoppers 2. In order to regulate the feed, the feed-pipes 14 are made vertically adjustable, so as to vary the distance between their lower or discharge ends and the bottom of the agitator, and consequently to vary the size of the outlet or discharge opening. To this end each feed-pipe is externally threaded, as shown in Fig. 5, and fits within a correspondingly-threaded sleeve 16, secured to the top of the agitator-box. Each feed-pipe is provided with a hand-wheel 17, whereby it may be turned to screw it up and down, and with a swivel-joint 18, connecting it with the pipe 15 to permit the feed-pipe to be rotated. Each sleeve 16 is provided with a set-screw 19, by means of which the corresponding feed-pipe may be locked in position after adjustment. The agitator is provided immediately below each feed-pipe with a conical boss or projection 20, which acts as a spreader to equalize the discharge of the pulverized ore from the feed-pipe. It will be understood, of course, that the frame or casing 3 is provided with a suitable opening 21 to permit the free movement of the feed-pipes and their connections. Air is drawn through the agitator by the means hereinafter described, its admission being controlled by a sliding gate or valve 22 at the inlet end of the agitator, and the position of said gate or valve is controlled by means of adjusting-screws 23, mounted to revolve in suitable bearings on the agitator-box and engaging threaded lugs or nuts 24, secured to the gate or valve 22. At the discharge end of the agitator is located a blast-fan 25, driven in any suitable way—as, for instance, by means of a belt 26 from the main shaft 9. The inlet-conduit 27 of this fan is connected by a flexible conduit 28 with the discharge end of the agitator 4, and by this means the material to be operated upon is conducted as it leaves the agitator to the eyes or receiving-openings of the fan-casing. To this end the inlet 27 is provided with inclined partitions 29, which divide the material in said inlet and conduct it to the receiving openings or eyes 30 of the fan-casing 31, as shown more particularly in Fig. 6 of the drawings. The outlet or discharge conduit 32 of the fan connects with or is extended to form an air passage or conduit. (Indicated as a whole by the reference-numeral 33 in Fig. 1 of the drawings.) Portions of the walls of this air passage or conduit are formed by the surfaces of a plurality of amalgamating-cylinders 34, actuated from any suitable source and having a surface covering of mercury, which is adapted to receive and form an amalgam with the gold-dust or other precious metal discharged from the blast-fan. One form of this air-passage and these cylinders which I have devised is shown in detail in Figs. 8 and 9 of the drawings. In this construction each cylinder 34 consists of a suitable body portion 35, mounted on an axis 36 and preferably constructed of iron by reason of its superior cheapness. The iron body 35 is covered with a copper sheathing 37, and this in turn is covered by a sheathing of copper wire gauze or netting 38, so applied as to be readily removable. In conjunction with each cylinder 34 I employ a concave 39, between which and the cylinder is located a portion of the air-passage 33, of which the surface of the cylinder forms a moving wall, the direction of movement being preferably the same as the direction of movement of the blast of air passing through the passage. As shown, the cylinders and concaves are inclosed in a suitable casing 40 and are preferably mounted in removable sections 41, suitably supported within the casing and adapted by their removal to give access to the cylinders and their associated mechanism. I prefer to arrange the cylinders, as shown, alternately on opposite sides of the air passage or conduit 33, so that all portions of the dust-laden current may be more thoroughly brought into contact with the surfaces of the cylinders, and to further this end the concaves may be provided with deflecting or baffle plates 42, arranged in any suitable manner—such, for instance, as that shown in Fig. 8—so as to cause the largest practicable agitation of the current without permitting the formation of dust-pockets.

Each cylinder 34 is provided with a supply-trough 43, containing a supply of mercury, which is indicated at 44 in Fig. 8 of the drawings, and in which the lower portion of the cylinder runs in such a way as to keep its surface constantly supplied with a film or covering of mercury. The troughs 43 are supplied with mercury from a supply-tank 45 by means of pipes 46, having suitable controlling-valves and detachable connections, and the ends of the troughs 43 are carried inward as closely as possible to the surface of the cylinder at each edge, as indicated at 47 and 48. In each trough is a roller 49, bearing against the surface of the cylinder immediately adjacent to the edge of the trough and serving not only to close the opening at this point and prevent the air-current in the passage 33 from entering the trough, but also to press the particles of matter firmly against and into the film of mercury upon the surface of the adjacent cylinder. This roller also has a tendency to remove the dust and dirt from the cylinder, and this dust and dirt will accumulate within the trough in the space immediately below said cylinder and between it and the upper surface of the mercury within the trough, upon which surface it will largely rest. In order to dispose of this dust or dirt, which is non-metallic and does not amalgamate with the mercury, I provide at one side an air-blast pipe 49, connected with a suitable source of supply of air under pressure and controlled by a valve 50. At the other side of the trough I provide an air-outlet 51, through which the dirt is discharged by reason of the air-blast from the pipe 49, which finds its outlet through said opening.

As many of the cylinders 34 are employed as may be necessary to effect a thorough separation of even the finest gold particles from the air-blast and the other materials carried thereby, and motion is imparted to these cylinders in any suitable manner. In the present instance I have shown the main shaft 9 as provided with a sprocket-wheel 52, while the shafts 36 of the cylinders are provided with sprocket-wheels 53. A sprocket-chain 54 passes around the several sprocket-wheels and around suitable idlers 55 in such a manner as to impart simultaneous and equal motion to all of the cylinders in alternately opposite directions.

At the bottom of the air-conduit 33 I provide a downwardly-deflected portion 56, which forms a trap into which the mercury and amalgam which may flow from the cylinders or troughs will gather and from which it may be drawn by a suitably-valved tap 57. The air-current, deprived of its precious metals, finds an outlet at the opening 58.

The apparatus thus constructed operates in the following manner: The pulverized ore is discharged by the elevators 1 into the hoppers 2 and passes thence through the feed-pipes into the agitator 4, the feed being regulated in the manner already described. The pulverized ore passes downward along the agitator 4 by reason of its inclination and movement and also by reason of the air-blast, which passes through said agitator from its receiving to its discharge end, said air-blast being regulated in an obvious manner by means of the gate or valve 22. The heavier or metallic particles gather in the cups 13 of the agitator, while the lighter particles, containing no metal or consisting of exceedingly small particles of metal in the shape of fine dust, are discharged at the lower end of the agitator. If desired, the cups 13 may be charged with mercury, in which case the agitator will act as an amalgamator instead of as a concentrator. The fine dust and fine gold are drawn into the eyes of the blast-fan 25, and in their passage through said fan, by reason of the contact of the particles with the blades and casing of the fan and with each other, the metallic particles are more thoroughly and effectually separated from the non-metallic and are, moreover, cleaned by friction, so as to be better adapted for ready amalgamation. During the passage of the air-current through the conduit 33 all portions thereof are repeatedly brought into contact with the mercury-coated surfaces of the cylinders, and these latter, moreover, are in constant motion, presenting fresh surfaces to the oncoming currents of air. By this means the fine particles of gold which would otherwise pass off with the dust are brought into contact and amalgamated with the mercury upon the surfaces of the cylinders, so that when the current finally issues from the apparatus it has practically been deprived of all the gold contained therein, no matter how minute the particles. The mercury is supplied to the cylinders in the manner already described, and said supply is kept clean by means of the air-blast provided for said purpose and by the action of the rollers, which also serve to render the amalgamation more effectual by increasing the intimacy of contact between the particles of metal and the mercury on the cylinders.

The concentrates or amalgam may be removed from the agitator 4 in any approved manner. By reason of the construction hereinbefore described access may be readily had to the cylinders 34, and their coverings of wire 38 may be removed and readily cleaned of the amalgam adhering thereto, while the copper sheathing 37 may also be readily scraped or cleaned to remove the amalgam thereon. The amalgam and mercury which gather in the trap 56 may be readily removed therefrom by the tap 57 or other suitable means.

It will be understood, of course, that the meshes of the wire-gauze covering of the cylinder form pockets or receptacles, which retain the mercury and the amalgam in a highly-efficient manner, while the ready detachability of the wire-gauze greatly facilitates the removal of this amalgam. This application of a wire gauze or netting to the surface of an amalgamating-cylinder effects a novel result over the mere application of such a gauze or netting to a horizontal amalgamating-surface, for the reason that with respect to the retention of the mercury horizontal and circular surfaces present very different conditions. On a horizontal surface the mercury lies practically inert and has no tendency to run off therefrom; but in the case of a cylinder there is obviously a constant tendency of the mercury to flow therefrom, thus constantly attenuating the layer that may still adhere thereto. The application of a wire gauze or netting to and in contact with the surface of the cylinder forms, in effect, a multitudinous series of mercury-retaining pockets thereon, which vastly facilitate the retention of the mercury in association with the cylinder and to that extent increase its amalgamating capacity. An additional function performed by the gauze or netting, where the same is made of copper and is applied to a copper cylinder, is to afford an increased exposed surface of copper whereby a correspondingly-increased exposed surface of mercury is presented to the passage of the ore-dust, the material of the gauze or netting having the same affinity for the mercury as the surface of the cylinder itself. Although this covering of copper wire-gauze forms a novel feature of my invention, yet, so far as the other features of the invention are concerned, fairly-good results may be obtained by employing cylinders having corrugated or otherwise roughened copper surfaces.

The construction above described may be varied without departing from the principle of my invention. For instance, I have shown in Fig. 10 an apparatus arranged for continuous running in which the troughs 43 are of less height at that side adjacent to the passage or conduit 33 than at the other side, so that under a continuous supply of mercury the amalgam may be discharged into said passage or conduit 33 and may be either continuously discharged from the trap 56, into which it falls by gravity, or withdrawn therefrom at invervals, as desired. Various other modifications in the details of the construction set forth may be made, and I do not wish to be understood as limiting myself to the precise construction hereinbefore set forth, and shown in the drawings.

I claim—

1. In a separator of the class described, the combination with a closed passage or conduit, of a mercury-coated cylinder forming a portion of the wall of said conduit, means for rotating said cylinder, and means for effecting the passage through said conduit of pulverized ore, substantially as described.

2. In a separator of the class described, the combination with an inclosed air passage or conduit adapted for the passage therethrough of a stream of pulverized ore, of a mercury-coated cylinder forming a portion of the wall of said conduit, means for rotating said cylinder, and a blast-fan or the like for maintaining a current of air through said conduit, substantially as described.

3. In a separator of the class described, the combination with an inclosed air passage or conduit adapted to receive a stream of pulverized ore, of mercury-coated cylinders forming portions of the walls of said conduit, means for rotating said cylinders, and a blast-fan or the like for creating a current of air through said conduit, substantially as described.

4. In a separator of the class described, the combination with an inclosed sinuous air passage or conduit, of mercury-coated cylinders arranged alternately on opposite sides of said passage or conduit and forming portions of the walls thereof, means for agitating said cylinders, and a blast-fan or the like for creating a current of air through said conduit, substantially as described.

5. In a separator of the class described, the combination with an inclosed air passage or conduit adapted to receive a stream of pulverized ore, of rotating amalgamating-cylinders forming portions of the opposite walls of said conduit, means for continuously supplying mercury to the surfaces of said cylinders, and a blast-fan or the like located at one end of the conduit for creating an air-current therethrough, substantially as described.

6. In a separator of the class described, the combination with a suitable frame or casing, of removable sections supported therein and having coöperating concaves and cylinders to form an inclosed air passage or conduit, said cylinders having mercury-coated surfaces, and a blast-fan or the like for creating a current of air through said conduit, substantially as described.

7. In a separator of the class described, the combination, with an air passage or conduit, of a rotating cylinder forming a portion of the wall thereof, a mercury-trough in which said cylinder runs, said trough having its entrance margin located immediately adjacent to the surface of the cylinder, and a roller located in the trough and bearing upon the cylinder immediately adjacent to the entrance margin of the trough, substantially as described.

8. In a separator of the class described, the combination, with a rotating cylinder and a mercury-trough having its entrance margin close to the surface of the cylinder above the level of the mercury, of an air-inlet nozzle located in one side of the trough at one end of the space thus formed, a source of supply of air under pressure connected with said nozzle, and an air-outlet in the other side of the trough at the other end of said space, substantially as described.

9. In a separator of the class described, the combination, with a mercury-coated revolving cylinder and a coöperating concave forming an air-passage, of deflecting or baffle plates extending from the concave into said air-passage in the direction of the air-current, substantially as described.

10. In a separator of the class described, the combination with an ore-conduit and means for passing ore therethrough, of an amalgamating-cylinder located in said conduit and provided with a covering of wire gauze or netting contacting the cylinder-surface, and means for continuously supplying a coating of mercury to said cylinder, substantially as described.

11. In a separator of the class described, the combination with an ore-conduit and means for passing ore therethrough, of an amalgamating-cylinder rotatably mounted in said conduit and provided with a removable covering of wire gauze or netting contacting the surface of the cylinder, and means for continuously supplying a coating of mercury to said cylinder, substantially as described.

12. In a separator of the class described, the combination with an ore-conduit and means for passing ore therethrough, of an amalgamating-cylinder rotatably mounted in said conduit and provided with a peripheral surface of copper, and a removable covering of copper wire gauze or netting contacting the surface of the cylinder, and means for continuously supplying a coating of mercury to said cylinder, substantially as described.

13. In a separator of the class described, the combination, with an air passage or conduit, of a rotating cylinder forming a portion of the wall thereof and provided with a removable covering of copper wire gauze or netting adapted to form a series of mercury-retaining pockets, and means for continuously supplying a coating of mercury to said cylinder, substantially as described.

14. In a separator of the class described, the combination, with an upright air passage or conduit, portions of the walls whereof are formed by moving mercury-coated surfaces, said passage or conduit being provided with a trapped portion near its discharge end, of means for blowing the material to be operated upon through said passage, substantially as described.

15. In a separator of the class described, the combination, with an upright air passage or conduit, portions of the walls whereof are formed by moving surfaces, the said passage or conduit being provided with a trapped portion near its lower outlet end, of means for continuously supplying mercury to said moving surfaces, and means for blowing the material to be operated upon through said passage or conduit, substantially as described.

FRANK C. O'BRIEN.

Witnesses:
FREDERICK C. GOODWIN,
IRVINE MILLER.